2,485,962

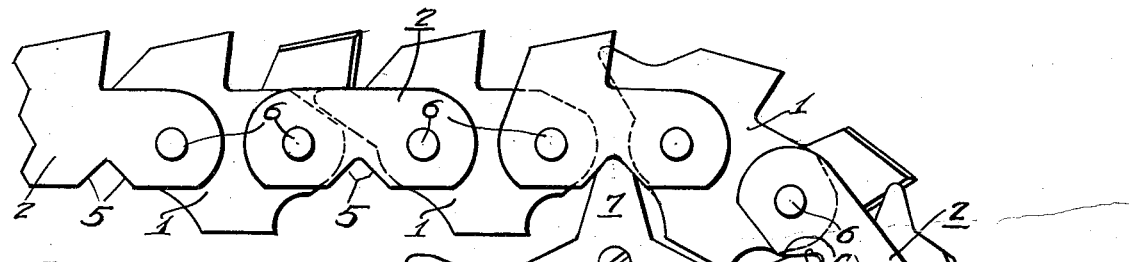
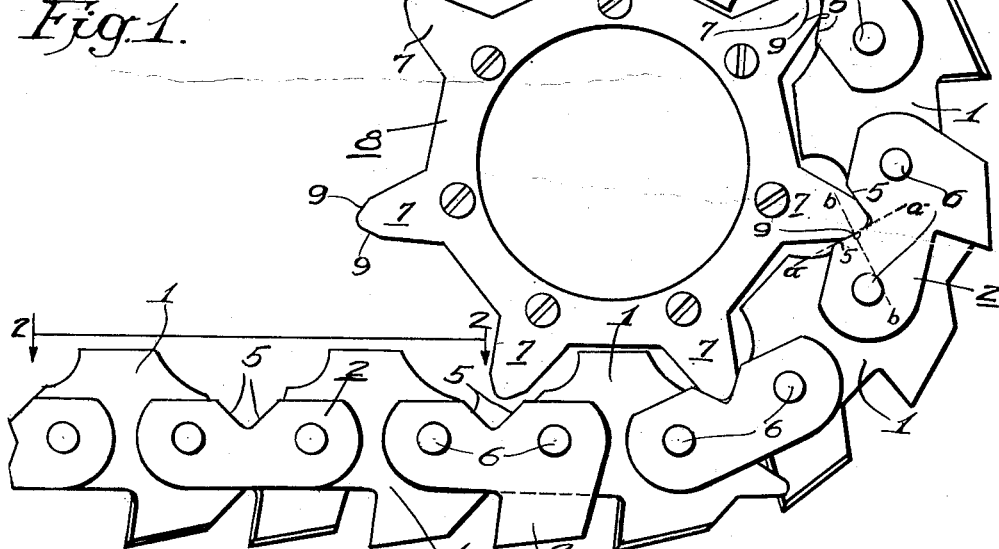
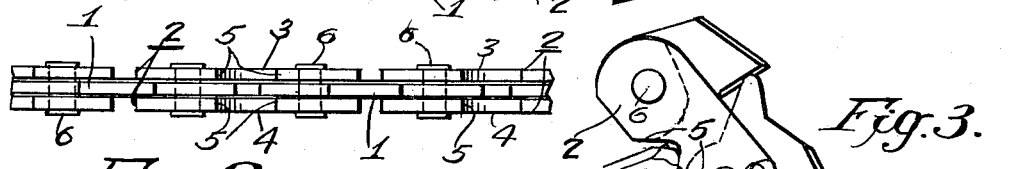
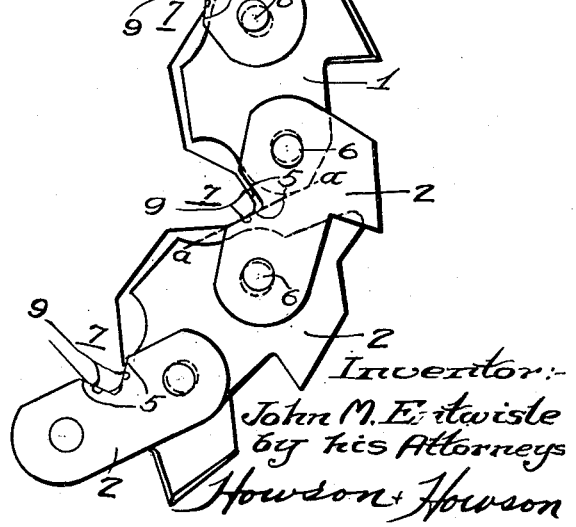
Fig. 1. Fig. 2. Fig. 3.
Inventor:—
John M. Entwisle
by his Attorneys
Howson & Howson Patented Oct. 25, 1949

UNITED STATES PATENT OFFICE 2,485,962

CHAIN SAW

John M. Entwisle, Philadelphia, Pa., assignor to Henry Disston and Sons, Inc., Philadelphia, Pa., a corporation of Pennsylvania Application May 22, 1945, Serial No. 595,083

4 Claims. (Cl. 143—135)

This invention relates to chain saws and more particularly to the driving means for the cutting chain.

A primary object of the invention is to provide a cutting chain and drive sprocket assembly of generally improved characteristics as hereinafter more fully set forth.

More specifically, an object of the invention is to provide an assembly of the stated character wherein the original stable driving connection between the sprocket and the chain will be maintained over extended periods of use and in spite of the inevitable elongation of the chain due to wear in the elements.

Another object is to provide a cutting chain and drive sprocket assembly wherein the links of the chain which carry the cutting teeth will be retained in the positions relative to the work in which they function most efficiently irrespective of the changes occurring in the assembly as the result of wear.

The invention resides further in certain structural details hereinafter described and illustrated in the attached drawings, wherein:

Fig. 1 is a side view of a cutting chain and its driving sprocket as made in accordance with the invention;

Fig. 2 is a fragmentary inside edge view of the cutting chain as viewed from the line 2—2, Fig. 1, and Fig. 3 is a fragmentary view of the chain and sprocket showing the relation of the elements of the assembly after wear has resulted in a stretching or elongation of the chain.

With reference to the drawings, the cutting chain, with the exception of certain structural details hereinafter described may be of conventional form, and in the present instance, I have shown the chain as consisting of a series of single links 1, interspersed with and connected by double links which have been designated generally by the reference numeral 2. Each double link consists of separate link elements 3 and 4 which lie, respectively, at opposite sides of the immediately associated single links 1, as shown in Fig. 2. The links 1 and the elements 3 and 4 of the double links 2 are provided with teeth in accordance with a system which has been found to function efficiently. Since the arrangement and character of the teeth form no part of the present invention, no specific description thereof will be provided.

Each of the elements 3 and 4 of the double links is provided at its inner edge with an angular recess 5, the flat sides of which converge toward the bottom of the recess, and, in the present instance, the individual recess is symmetrically disposed with respect to a plane intersecting the bottom of the recess and normal to the longitudinal center line of the link element, said center line in the present instance intersecting the axes of the pins 6, 6 which respectively connect the link element in articulated relation to the immediately adjoining single links 1. The recesses 5 of the elements of each individual double link 2 are identical and are aligned transversely of the chain.

The recesses 5 are adapted to be engaged by the teeth 7 of a driving sprocket 8, as shown in Fig. 1, and the outer ends of the teeth are formed with flat inclined surfaces 9 which converge toward the apex of the tooth and which are angularly disposed with respect to each other and to a radial line intersecting the apex of the tooth so as to accurately fit the aforesaid recesses 5 with the surfaces 9 in flat face to face contact with the flat inclined sides of the engaged recess. The normal relationship between the teeth of the sprocket and the recesses 5 is clearly shown in Fig. 1, and it will be noted that the thrust of the sprocket is transmitted to the chain through contacting flat coplanar faces, the common contact plane being indicated by the broken line a—a. It will be noted by reference to Fig. 1 that a line b—b, normal to the line a—a and intersecting the line a—a at a point midway between the ends of the contact area, will extend in proximity to the axis of that one of the pivots 6 which lies immediately in advance of said area. Normally, the flat face at the trailing side of the sprocket tooth will also flatly engage the corresponding surface of the recess 5 of the double link 2.

It will be noted by reference to Fig. 1 that the single links 1 are formed at their ends so that the edges thereof are remote to the sides of the proximate recesses 5 of the adjoining double links, so that contact between the sprocket teeth and the chain is confined to the double links and to the flat sides of the recesses 5 of said links.

Certain important functional characteristics arise from the aforedescribed structural relation between the driving sprocket and the chain. Since the contact between the chain and the sprocket teeth is confined to the double links, a maximum of chain stability will be achieved. In other words, the effective bearing of the chain upon the teeth corresponds to the overall width of the double links which in effect is the major width of the chain. A stable seat is thus established which tends to maintain the chain in its normal plane and precludes tilting to the right or left under the stresses and strains to which it is subjected in operation. Furthermore, and as illustrated in Fig. 3, the stretching of the chain due to wear will not disturb this relatively stable engagement between the sprocket teeth and the chain. The effect of such stretching of the chain is to increase the pitch diameter of the chain, whereas the pitch diameter of the sprocket is fixed. As a result, the links of the chain tend to assume the positions with respect to the sprocket which is illustrated in Fig. 3, wherein the increased pitch of the chain is shown as resulting in a riding up of the links upon the outer ends of the teeth and consequent separation of the flat contact surfaces of the trailing sides of the teeth and recesses. It is to be noted, however, that in spite of this maladjustment of the chain with respect to the sprocket, the original flat surface to surface contact between the leading sides of the teeth and recesses is maintained. It will be noted also that the links of the chain are retained continuously and irrespective of stretch in a normal position with respect to the sprocket teeth, this position in the present embodiment being one wherein the aforesaid longitudinal axes of the links are normal in each instance to a radial plane through the bottom of the tooth-receiving recess 5.

I claim:

1. In a chain saw, a driving sprocket having teeth each provided at its outer end with flat terminal surfaces angularly disposed to the side surfaces of the tooth which extend between the terminal surfaces and the root, said terminal surfaces converging toward the tip of the tooth and forming equal angles to a plane radial to and containing the axis of the sprocket and intersecting said tip, and a cutting chain having pivotally connected links provided with shallow recesses for reception of the said ends of the sprocket teeth, each said recess having flat converging sides forming equal angles with a plane normal to the longitudinal axis of the link and bisecting the recess, said axis being defined by a line intersecting the centers of the link pivots, the angle comprehended between said sides of the recesses corresponding to the comprehended angle between the said terminal surfaces of the sprocket teeth, whereby the surfaces of the teeth may seat flatly upon the sides of the respectively associated recesses, said chain being supported on the sprocket solely within said recesses, and the pivots of each recessed link being disposed so that lines normal to the said flatly seated surfaces of the teeth and link and intersecting the approximate center of contact of said surfaces will also intersect the pivot positioned immediately in advance of said surfaces.

2. In a chain saw, a driving sprocket having teeth each provided with a flat driving surface disposed at a substantial angle with respect to an intersecting radial line from the axis of the sprocket, an articulated cutting chain comprising pivotally connected links and having recesses in individual links for reception of said teeth, the leading side of each recess with reference to direction of chain travel being defined by a flat link surface disposed at an angle to a line intersecting the axis of the link pivots such that when the said line coincides with the pitch line of the chain the said link surface will be in position for flat engagement with the driving surface of the teeth, said links finding their sole support on the sprocket within said recesses, and the said pivots being disposed so that lines normal to the flatly engaged surfaces and intersecting the approximate centers of contact thereof will also intersect the pivots immediately in advance of said surfaces.

3. A chain saw according to claim 2 wherein the flat driving surfaces of the sprocket are confined to the outer extremities of and are remote from the roots of the teeth.

4. A chain saw according to claim 2 wherein the chain comprises alternately arranged single and double links with the ends of the single links secured between the individual elements of the double links and wherein further the tooth-receiving recesses are contained in the double links.

JOHN M. ENTWISLE.

REFERENCES CITED

The following references are of record in the file of this patent:

UNITED STATES PATENTS

| Number | Name | Date |
| --- | --- | --- |
| 434,494 | Wilkin | Aug. 19, 1890 |
| 596,802 | Brown et al. | Jan. 4, 1898 |
| 1,467,150 | Frere | Sept. 4, 1923 |
| 1,520,422 | Lind | Dec. 23, 1924 |
| 2,296,240 | Blum | Sept. 22, 1942 |
| 2,356,437 | Smith | Aug. 22, 1944 |
| 2,380,753 | Hardaf Segerstad | July 31, 1945 |

FOREIGN PATENTS

| Number | Country | Date |
| --- | --- | --- |
| 549,945 | Great Britain | Dec. 15, 1942 |